US007733043B2

(12) United States Patent
Casella et al.

(10) Patent No.: US 7,733,043 B2
(45) Date of Patent: Jun. 8, 2010

(54) REVOLVING DOOR CONTROL SYSTEM

(75) Inventors: Zachary T. Casella, Aliquippa, PA (US); Michael F. Stadler, Pittsburgh, PA (US); Thomas P. Schluep, Mars, PA (US)

(73) Assignee: B.E.A., Inc., Pittsburgh, PA (US)

( * ) Notice: Subject to any disclaimer, the term of this patent is extended or adjusted under 35 U.S.C. 154(b) by 288 days.

(21) Appl. No.: 11/823,470

(22) Filed: Jun. 27, 2007

(65) Prior Publication Data

US 2008/0028682 A1 Feb. 7, 2008

Related U.S. Application Data

(60) Provisional application No. 60/816,768, filed on Jun. 27, 2006.

(51) Int. Cl.
*H02P 8/06* (2006.01)
*H02P 8/08* (2006.01)

(52) U.S. Cl. ....................... 318/280; 318/256; 340/534; 340/528; 340/541; 340/5.2; 340/545.3; 340/556; 49/42; 49/506

(58) Field of Classification Search ................. 318/280, 318/256; 340/545.1, 534, 528, 541, 545.3, 340/556, 5.2; 49/13, 42, 506; 250/336.1
See application file for complete search history.

(56) References Cited

U.S. PATENT DOCUMENTS 5,097,454 A 3/1992 Schwarz et al.
5,191,268 A * 3/1993 Duhame ..................... 318/266
5,285,136 A * 2/1994 Duhame ..................... 318/266
6,720,874 B2 * 4/2004 Fufido et al. ................ 340/541
7,173,516 B2 * 2/2007 Mullet et al. ............... 340/5.71
7,315,143 B2 * 1/2008 Mullet et al. ............... 318/280
2001/0030689 A1 * 10/2001 Spinelli ..................... 348/155
2002/0176607 A1 * 11/2002 Bond et al. ................. 382/107
2004/0017929 A1 1/2004 Bramblet et al.
2005/0093697 A1 * 5/2005 Nichani et al. ........... 340/545.1
2006/0086894 A1 * 4/2006 Shepherd .................... 250/221
2007/0047837 A1 * 3/2007 Schwab et al. .............. 382/285
2007/0094932 A1 * 5/2007 Hoshide et al. ............... 49/370

* cited by examiner

*Primary Examiner*—Rita Leykin
(74) *Attorney, Agent, or Firm*—The Webb Law Firm

(57) ABSTRACT

In a method and system for controlling a revolving door that has a plurality of chambers defined by wings of a revolver, at least one imaging sensor is provided for acquiring images of a first area where the plurality of chambers rotatably pass by or through. A drive causes the revolver to rotate in a first direction from a first position where a user can enter a first chamber via the first opening. Images are acquired by the one imaging sensor and signals are acquired from a position sensor that is operative for outputting signals indicative of the angular position of the revolver. Based on the signals acquired from the position sensor, each imaging sensor or its output is disabled and/or each image acquired by each imaging sensor is ignored when each door wing is in field-of-view of the imaging sensor.

20 Claims, 8 Drawing Sheets

REVOLVING DOOR CONTROL SYSTEM

CROSS REFERENCE TO RELATED APPLICATIONS

This application claims the benefit of U.S. Provisional Patent Application No. 60/816,768, filed Jun. 27, 2006, which is incorporated herein by reference in its entirety.

BACKGROUND OF THE INVENTION

1. Field of the Invention

The present invention relates to revolving security doors and so-called, man-traps.

2. Description of Related Art

Security doors and, so-called man-traps (hereinafter individually and collectively referred to as "security doors" or "security door") are used in airports, banks, commercial buildings, military installations, and other locations where restricted access is desirable. In many instances, such security doors are embodied as revolving doors. In a common, non-limiting, embodiment of a revolving security door, a person inserts a pass card into a card reader that is interfaced with a control system for the door, and enters a chamber on one side of the door. If the card is authorized, the door will turn its panels or wings and thus each chamber until the entered chamber moves from a first door opening, e.g., the entrance, to a second door opening, e.g., the exit. As the entered chamber passes from the first door opening to the second door opening, all of the other chambers move by a corresponding amount. Therefore, it is possible for an unauthorized person to "tailgate", i.e., to enter a chamber located at the second door opening or a door opening immediately following the enclosed chamber, or to "piggyback", i.e., to enter the same compartment as the authorized person. In such situations, prior art systems stop the door thereby trapping the unauthorized person in a chamber. If the door has a "trapped man" feature to detect such a situation, the control system will cause the door to reversely rotate after stopping to force the unauthorized "trapped" person back to his starting point. If the door is not equipped with such a "trapped man" feature, the next authorized party to enter the doorway will allow the unauthorized party to pass to the exit. In the situation where a "tailgater" is attempting to pass from the second door opening to the first door opening, the system may also detect him and return him to his starting point before allowing his compartment to reach the entrance.

One way that tailgating has been detected is by the use of floor mats in the security door to detect when a compartment has been entered. However, such mats have several drawbacks. First, rain, snow, dirt or other foreign matter can often cause mat failures. Second, a mat cannot detect a person or object such as a gun or a security pass card attached to the door frame. Third, it is difficult to make a mat sufficiently sensitive to lightweight objects. Fourth, the construction of certain revolving security doors makes it possible for a person to not touch a floor mat in the security door as the door passes between a first door opening and a second door opening thereof. Such construction can include a ledge adjacent the base of one or more door wings where a person can stand above the floor mat during rotation of the revolving door. Moreover, it is envisioned that an unauthorized object, such as a weapon, could be secured, e.g., taped, to the surface of a door wing whereupon said object could pass the openings of the revolving door without contacting the floor mat thereof. Accordingly, there is a need to more accurately and reliably detect whether unauthorized persons or objects have entered a compartment of a revolving security door.

It has been proposed to use ultrasonic sensors instead of mats, but use of such sensors in a revolving door presents problems. First, it is well known that the low frequencies used by ultrasound sensors are near the upper frequency hearing limit of human beings and, therefore, the output of ultrasound sensors may be detectable by certain individuals having an extended frequency hearing. Second, it is well known that ultrasound waves used by ultrasound sensors are susceptible to distortion by moving air which can be caused either by rotation of the door in use or by a flow of air through the door caused by the difference in positive air pressure inside a building in which the door is installed due to the operation of the buildings' HVAC system and a lower air pressure outside the building. Such movement of air can distort the ultrasound waves rendering detection of objects or persons difficult. Third, to detect small objects such as pass cards or firearms, the sensors must have a high gain. Such high gain increases the likelihood that reverberations or echoes will cause false readings. This is especially true in a security revolving door which has a substantially closed housing. Similarly, the greater the range (portion of the floor to ceiling distance) covered by the sensor, the greater the likelihood of false readings due primarily to echoes from the floor. Furthermore, such sensors do not have the ability to distinguish between an actual object or person located in one of the compartments and on one of the door wings.

Accordingly, a need exists for a control system for a revolving security door with the ability to positively identify a person or object passing from one side of the revolving door to the other while ignoring the door wings.

SUMMARY OF THE INVENTION

The invention is a method for controlling a revolving door comprised of a housing having a first opening, a second opening and a revolver positioned within the housing, the revolver having a plurality of door wings positioned about a rotation axis and dividing the housing into a plurality of chambers, the revolver operative for rotatably moving each chamber between the first opening and the second opening and vice versa. The method includes (a) providing at least one infrared imaging sensor, the one infrared imaging sensor operative for acquiring infrared images of a first area where the plurality of chambers rotatably pass by or through; (b) providing a drive means that is operative for rotating the revolver about the rotation axis; (c) providing a position sensor that is operative for outputting signals indicative of the angular position of the revolver; (d) causing the drive means to rotate the revolver in a first direction from a first position where a user can enter a first chamber via the first opening; (e) acquiring infrared images via the one infrared imaging sensor and acquiring signals from the position sensor; and (f) based on the signals acquired from the position sensor, disabling each infrared imaging sensor or its output and/or ignoring each infrared image acquired by each infrared imaging sensor when each door wing is in its field-of-view.

Step (d) can be executed in response to authorization by an authorization means disposed adjacent the first opening. Step (d) can include rotating the revolver to a second position where the user can exit the first chamber via the second opening.

The authorization means can be a card reader, a barcode reader, a biometric sensor or any combination thereof.

Step (e) can include acquiring infrared images within at least one chamber when said one chamber is aligned with the first area. The method can further include one of the following: (1) rotating the revolver to the second position; or (2) causing the drive means to not rotate the revolver and/or to rotate the revolver in a second, opposite direction when: (i) more than one user is detected in the one chamber via the infrared images acquired by the one infrared imaging sensor; (ii) an unauthorized user is detected in a second chamber that is aligned with the first area immediately following the passage of the one chamber by or through the first area via infrared images acquired within the second chamber by the one infrared imaging sensor; and/or (iii) an unauthorized user is detected in a third chamber in alignment with a second area via infrared images acquired within the third chamber by another infrared imaging sensor.

Step (2) can include rotating the revolver back to the first position. In step (2)(iii), the other imaging sensor can be operative for acquiring images within the third chamber on or about the time the one imaging sensor acquires images in the first or second chamber. Step (2) can further include providing an alarm.

The revolver can have two, three or four wings dividing the housing into two, three or four chambers, respectively. The first position can be either an X-position or a +-position of the wings with respect to the openings.

The one infrared imaging sensor can be either an active sensor operative for receiving and processing reflected infrared light that is initially output thereby, a passive infrared imaging sensor that receives infrared light that is output by at least one object in its field-of-view, or at least one camera for receiving and processing light in the visible spectrum.

The invention is also a control system for use with a revolving door comprising a housing having a first opening, a second opening, a floor and a ceiling, and a revolver having a plurality of wings positioned about a rotation axis and dividing the housing into a plurality of chambers, the revolver positioned within the housing between the first and second openings, the revolver operative for rotatably moving each chamber within the housing. The control system includes a first infrared imaging sensor for acquiring infrared images of a first area of the housing by or through which a first chamber passes; a drive for rotating the revolver about the rotation axis; a position sensor operative for outputting signals related to the angular position of the revolver; and a controller operative for processing the infrared images acquired by the first infrared imaging sensor and for determining therefrom a presence or absence of an object in the first chamber, for causing the drive means to rotate the revolver in response to a user's initiation, for detecting the angular position of the revolver via the position sensor, and for determining as a function of the signals output by the position sensor related to the angular position of the revolver when to (i) ignore infrared images acquired by the first infrared imaging sensor when each door wing is in a field-of-view thereof and/or (ii) disable the first infrared imaging sensor or its output when each door wing in the field-of-view thereof.

The control system can further include an authorization means disposed on the first opening side of the chamber and operative for identifying an authorized user.

The authorization means can be a card reader, a barcode reader, a fingerprint or thumbprint scanner, a retinal scanner or any combination thereof.

A second infrared imaging sensor can be provided for acquiring infrared images of a second area of the housing by or through which a second chamber passes on or about a time the first chamber passes through the first area. The controller can be operative for processing the infrared images acquired by the second infrared imaging sensor, for determining therefrom a presence or absence of an object in the second chamber, and for determining as a function of the angular position of the revolver when to (i) ignore infrared images acquired by the second infrared imaging sensor when each door wing in a field-of-view thereof and/or (ii) disable the second infrared imaging sensor or its output when each door wing is in the field-of-view thereof.

In response to authorization by an authorization means disposed adjacent the first opening, the controller can cause the drive to rotate the revolver in a first direction. In response to detecting via any of the acquired infrared images the presence of an unauthorized object in at least one chamber, the controller can cause the drive to stop rotation of the revolver and/or cause the drive to rotate the revolver in a second, opposite direction.

The unauthorized object can be at least one of the following: one of a pair of objects in the first chamber as it passes through the first area; an object in the second chamber as it passes by or through the second area on or about the time the first chamber passes by or through the first area; and/or an object in a third chamber that begins passing by or through the first area immediately following passage of the first chamber by or through the first area.

The control system can further include an alarm for providing a signal in response to detecting the unauthorized object.

The revolver can have one of the following: two wings dividing the housing into two chambers, three wings dividing the housing into three chambers; or four wings dividing the housing into four chambers. When four wings divide the housing into four chamber, the controller causes the revolver to rotate about 180 degrees each time the authorization means identifies an authorized user. When three wings divide the housing into three chamber, the controller causes the revolver to rotate about 120 degrees each time the authorization means identifies an authorized user.

The first imaging sensor can be either an active sensor operative for receiving and processing reflected infrared light that is initially output thereby, or a passive infrared imaging sensor that receives infrared light that is output by at least one object in its field-of-view, or at least one camera for receiving and processing light in the visual spectrum.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE INVENTION

Figure 1:
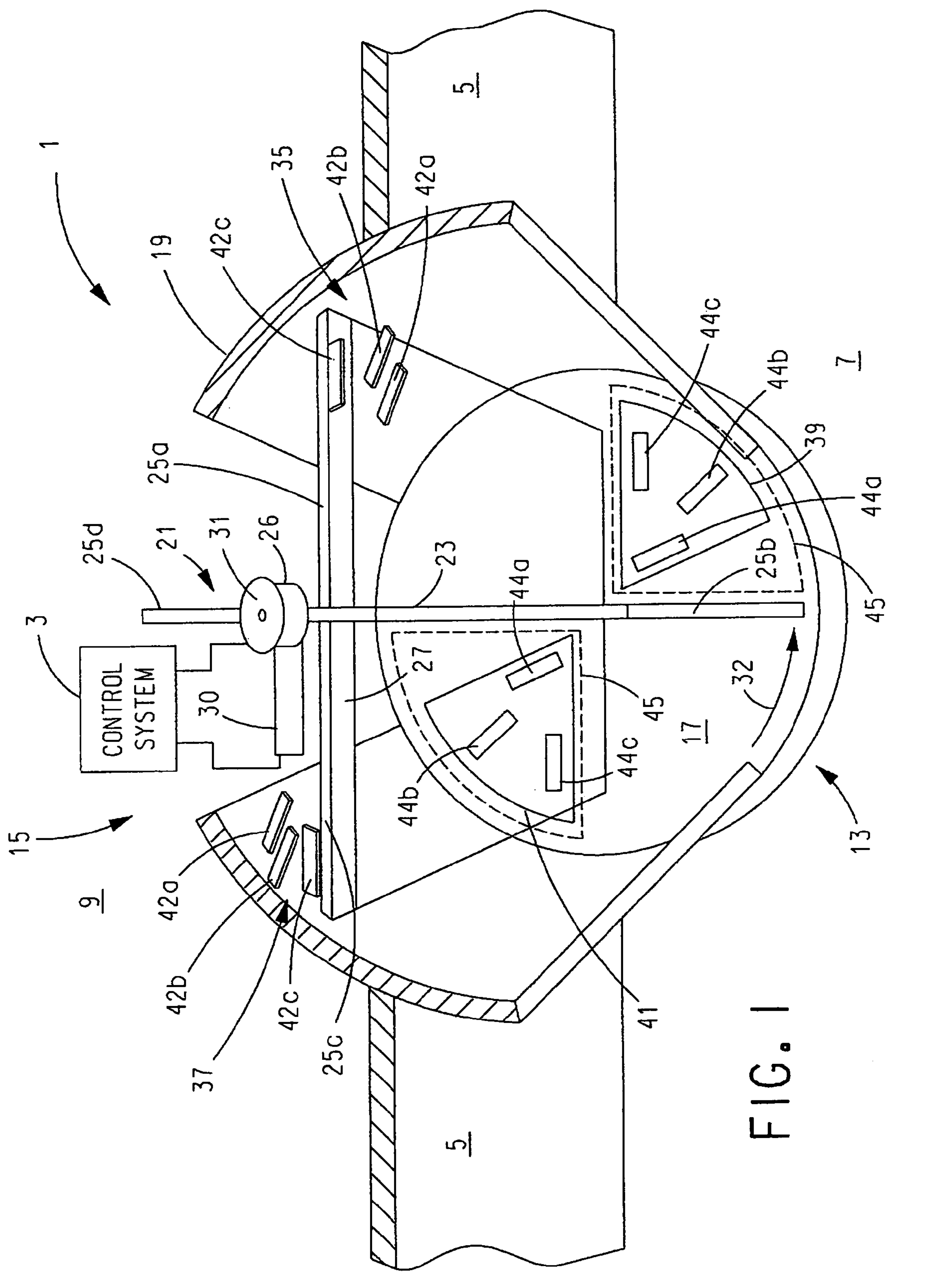
FIG. 1 is a top perspective view of a revolving door and a revolving door control system in accordance with the present invention.

The present invention will be described with reference to the accompanying figures where like reference numbers correspond to like elements.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

With reference to FIG. 1, a revolving door 1 with a control system 3 is incorporated into a wall 5 which separates a first area 7 from a second area 9. The combination of wall 5 and revolving door 1 functions as a security barrier between areas 7 and 9. The following description will be provided for an embodiment where revolving door 1 separates two secure areas. However, this is not to be construed as limiting the present invention as it is envisioned that revolving door 1 may separate a secure area from a non-secure area.

Revolving door 1 comprises a cylindrical housing 11 with a first opening 13 connecting the interior of housing 11 to first area 7 and a second opening 15 connecting the interior of housing 11 to second area 9. Cylindrical housing 11 further includes a circular floor 17 and a circular ceiling 19. Cylindrical housing 11 may be constructed from any suitable and/or desirable materials such as, without limitation, standard or safety glass, bullet-proof glass, acrylic, solid bars, steel, brass and the like.

A revolver 21 is disposed in the housing to divide first area 7 from second area 9. Revolver 21 has a rotation axis 23 defined between ceiling 19 and floor 17 along an axis of revolution of door 1. Revolver includes wings 25, spaced approximately 90° from one another, project outwardly from rotation axis 23 and are of sufficient length to sweep close an interior surface of housing 11. While revolver 21 is described herein as having four wings 25*a*, 25*b*, 25*c* and 25*d* spaced approximately 90° from one another, this is not to be construed as limiting as it is envisioned that a revolver 21 with more, i.e., greater than four wings or fewer, i.e., two or three wings, wings could be utilized. Each wing 25 includes a frame 27 supporting a pane 29. However, this is not to be construed as limiting the invention since it is envisioned that wings 25 can be formed in a variety of different ways including, but not limited, as solid panes, bars, gratings and the like.

Revolver 21 can include a central shaft (not shown) that can define rotation axis 23. Alternatively, frames 27 of a plurality of wings 25 can be coupled together between floor 17 and ceiling 19 in a manner to define rotation axis 23. Still further, frames 27 of a plurality of wings 25 can be coupled to circular ceiling 19 which itself is rotatable about rotation axis 23. Other manners of defining rotation axis 23 are also envisioned. Accordingly, rotation axis 23 is not to be construed as being limited to any particular physical structure or arrangement.

Revolving door 1 further includes a drive 30, such as an electric motor, coupled to revolver 21 and operating under the control of control system 3, and a position sensor 31 coupled to drive 30 or revolver 21 and interfaced with control system 3. Position sensor 31 can be, without limitation, an encoder or a resolver which provides to control system 3 signals indicative of the angular position of revolver 21 and, hence, wings 25. For the purpose of describing the present invention, it will be assumed that position sensor 31 is an encoder. However, this is not to be construed as limiting the invention.

Drive 30 is coupled to revolver 21, either directly or via a gear box 26, such that in normal operation drive 30 rotates revolver 21 in the direction shown by arrow 32 in FIG. 1. Revolving door 1 may further include an authorization device 28 (shown in FIG. 4) interfaced with control system 3 for identifying an authorized user and for signaling control system 3 to cause drive 30 to rotate revolver 21 in a manner to be described hereinafter. Authorization device 28 may be any suitable device for identifying an authorized user including, but not limited to, a card reader, a barcode reader or a biometric reader, such as, without limitation, a fingerprint or thumbprint scanner or a retinal scanner.

Figure 2:
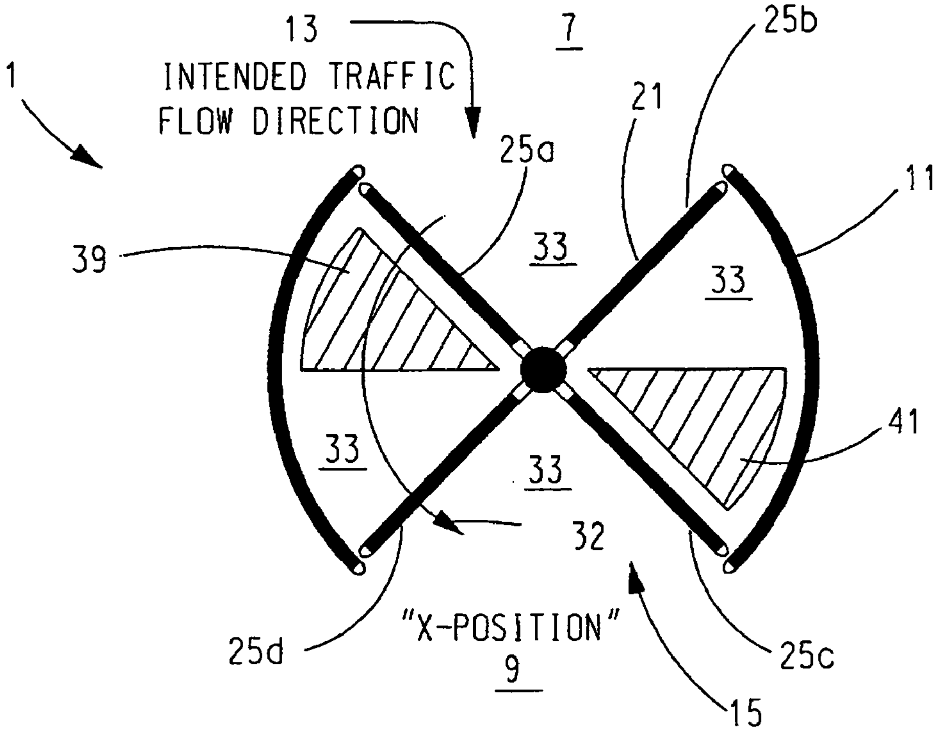
FIG. 2 is a cross-sectional top view of the revolving door shown in FIG. 1 in an "X" position.
Figure 3:
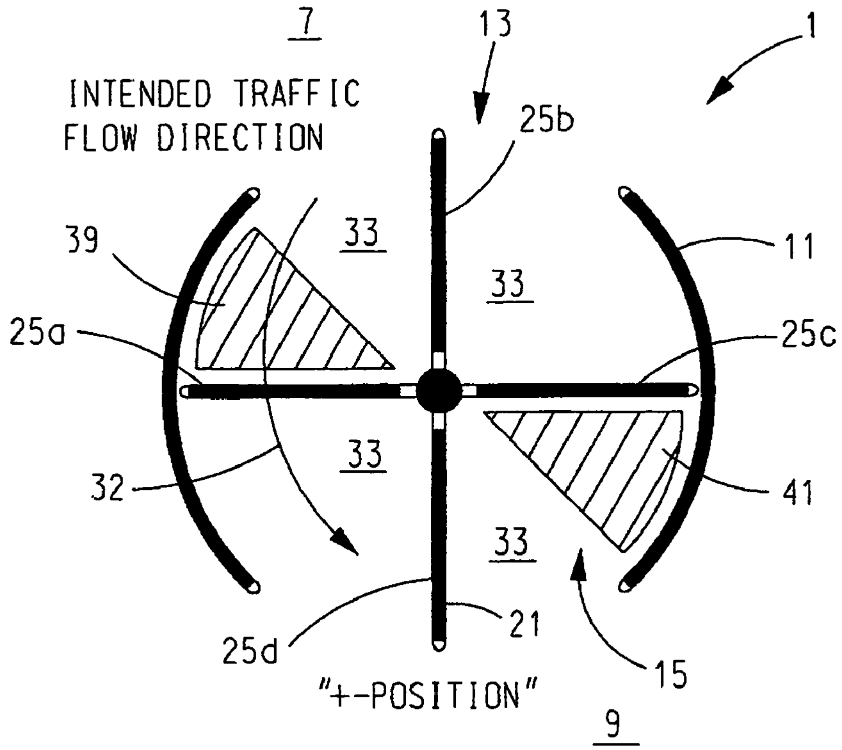
FIG. 3 is a cross-sectional top view of the revolving door shown in FIG. 1 in a "+" position.

With reference to FIGS. 2 and 3, and with continuing reference to FIG. 1, wings 25 cooperate with housing 11 to define four rotatable pie-slice-shaped chambers 33. A person desiring to move from one of the areas 7 or 9 to the other enters a selected chamber 33 and travels therein between first opening 13 and second opening 15 or vice versa.

Ceiling 19 (either a stationary ceiling or a rotatable ceiling) of revolving door 1 is typically defined by or is incorporated into a ceiling (not shown) of a facility. A first imaging device 35 and a second imaging device 37 are disposed in or above ceiling 19 and are interfaced to control system 3. Where imaging devices 35 and 37 are positioned above ceiling 19, ceiling 19 is made of a material that is essentially transparent to the wavelengths of electromagnetic radiation, e.g., light, utilized by imaging devices 35 and 37 for detecting the presence of objects in chambers 33.

Imaging devices 35 and 37 acquire images of a first area 39 and a second area 41, respectively. Each imaging device 35 and 37 desirably includes a plurality of infrared imaging sensors 42*a*, 42*b*, 42*c* arranged to obtain images of different portions of first area 39 and second area 41, respectively, thereby establishing a detection pattern. However, this is not to be construed as limiting the invention since it is envisioned that each imaging device 35 and 37 can include any number of infrared imaging sensors 42, including one, two, or more than three infrared imaging sensors 42.

As shown in FIG. 1, first area 39 resides adjacent first opening 13 whereupon a person entering the chamber 33 defined between wings 25*a* and 25*b* will either be in the field-of-view of one or more infrared imaging sensors 42 of imaging device 35 or, in response to rotation of revolver 21 in the direction shown by arrow 32, move into the field-of-view of one or more infrared imaging sensors 42 of imaging device 35. Second area 41 resides adjacent second opening 15 whereupon a person entering the chamber 33 defined between wings 25*c* and 25*d* will either be in the field-of-view of one or more infrared imaging sensors 42 of imaging device 37 or, in response to rotation of revolver 21 in the direction shown by arrow 32, move into the field-of-view of one or more infrared imaging sensors 42 of imaging device 37.

While the use of infrared imaging sensors 42 is described herein, the use of other imaging sensors that utilize wavelengths other than wavelengths in the infrared spectrum is envisioned. Non-limiting examples of other such imaging sensors include microwave sensors and a sensor operating in the human visual spectrum. Two or more sensors operating in the visual spectrum can be oriented and configured such that their output is combined to produce a three dimensional image of any object in a chamber 33 passing through their fields of view. For purpose of the following description, each imaging sensor 42 of imaging devices 35 and 37 will be described and considered to be an active infrared imaging sensor which outputs infrared light and detects reflections of said infrared light from one or more objects in its fields-of-view. However, this is not to be construed as limiting the invention since the use of one or more passive infrared imaging sensors operative for receiving and processing infrared light that is output by one or more objects in its field-of-view is envisioned. Moreover, the description of the present invention as utilizing infrared imaging sensors is not to be construed as limiting the invention since it is envisioned that the use of imaging sensors operating in other wavelengths, e.g., the human visual spectrum, may also be used.

Each infrared imaging sensor 42 desirably outputs a focused pattern of infrared light that is desirably non-overlapping with the infrared light output by each other imaging sensor 42. For example, as shown in FIG. 1, each set of imaging sensors 42*a*-42*c* output focused patterns of light 44*a*-44*c*, respectively. Desirably, each infrared imaging sensor 42 is configured to only detect the infrared light output thereby or, where infrared imaging sensor is a passive infrared imaging sensor, to only detect light in its field of view, which field-of-view desirably corresponds to the pattern 44 shown in FIG. 1.

For each infrared imaging sensor 42 of each imaging device 35 and 37, control system 3 determines if an object is present in the field-of-view of the infrared imaging sensor 42 by comparing two or more images acquired thereby. If an object moves into the field-of-view of the infrared imaging sensor 42, control system 3 will detect a difference between an infrared image acquired from the field-of-view of the infrared imaging sensor 42 without the object present and an infrared image acquired from the field-of-view with the object present. Control system 3 interprets any differences in two or more images acquired by each infrared imaging sensor 42 of each imaging device 35 and 37 as an indication that an object is present in the field-of-view thereof. For simplicity of describing the present invention, hereinafter each infrared imaging sensor 42 of each imaging device 35 and 37 will be described as detecting or seeing an object in its corresponding field-of-view. However, it is to be understood that such detection is actually accomplished by control system 3 detecting a difference between two or more images acquired by the infrared imaging sensor 42. Similarly, hereinafter, each infrared imaging sensor 42 of each imaging device 35 and 37 described as not detecting or seeing an object in its field-of-view is to be understood as control system 3 determining that two or more images acquired from the sensor are the same.

Figure 4:
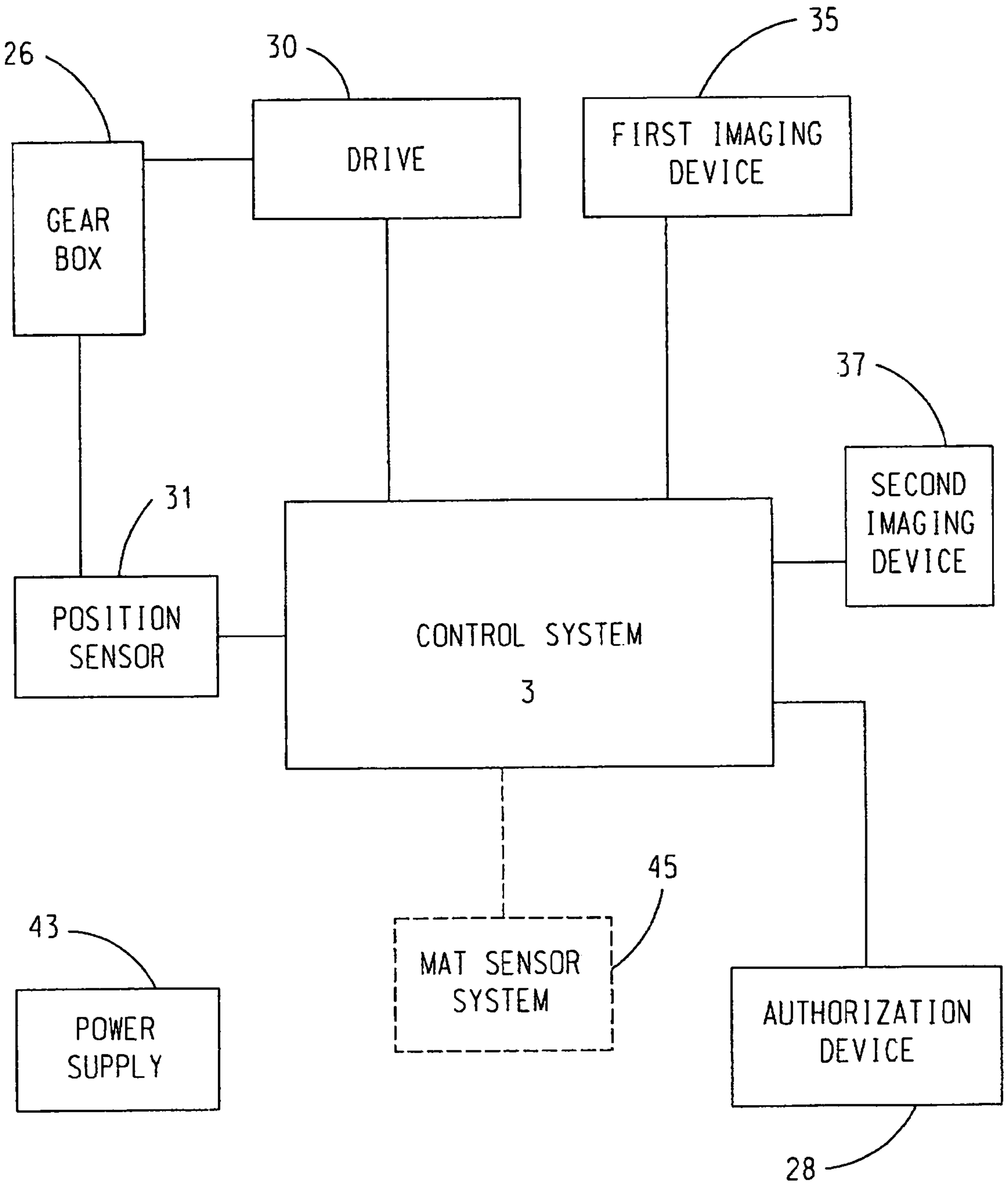
FIG. 4 is a block diagram of the revolving door control system of FIG. 1.

With reference to FIG. 4 and with continuing reference to all previous figures, control system 3 is operatively coupled to drive 30, authorization device 28, position sensor 31 and imaging devices 35 and 37. A power supply 43 is provided for supplying electrical power to the various electronic and electrical components (not shown) of control system 3, position sensor 31, authorization device 28, drive 30, and first and second imaging devices 35 and 37 as required.

Control system 3 may further be coupled to an optional conventional mat sensor system 45, shown in phantom. Mat sensor system 45 may be provided as a backup to imaging devices 35 and 37, or may be configured to provide additional information to control system 3. In general operation, control system 3 gathers information from imaging devices 35 and 37 and position sensor 31. Using the gathered information, control system 3 controls drive 30, and hence, door 1 in the manner to be described hereinafter.

In order to avoid each door wing 25 entering a field-of-view of an infrared imaging sensor 42 from being construed as an object in one of the chambers 33, prior to operational use, door 1 and control system 3 require a learn cycle to be performed to learn the angular position of revolver 21 where each wing 25 thereof will be in the field-of-view of each infrared imaging sensor 42. The learn cycle is initiated by a user causing control system 3 to activate drive 30 to rotate revolver 21 from a start position. The start position may either be the X-position shown in FIG. 2 or the +-position shown in FIG. 3. The X-position provides a 90° opening into a chamber 33 before revolver 21 starts rotating, whereas the +-position provides only a 45 degrees opening into a chamber 33 before revolver 21 starts to rotate. Regardless of the start position, the overall function of revolving door 1 is the same.

As revolver 21 rotates from its start position during the learn cycle, each infrared imaging sensor 42 detects when each wing 25 is passing through its field-of-view. At the same time that each infrared imaging sensor 42 detects the presence of a wing 25 in its field-of-view, position sensor 31 provides signals to control system 3 indicative of the angular position of revolver 21 during the time said wing 25 is in the field-of-view of said infrared imaging sensor 42. Control system 3 utilizes this information to determine the angular position of revolver 21 when each infrared imaging sensor 42 detects the presence of each wing 25 in its field-of-view. Control system 3 then utilizes the signals provided by position sensor 31 and the information gathered from each infrared imaging sensor 42 during this learn cycle to record when each wing 25 will pass through the field-of-view of said infrared imaging sensor 42. By performing this learn cycle, control system 3 is able to anticipate when each wing 25 will pass through the field-of-view of each infrared imaging sensor 42 during normal operation of door 1 whereupon control system 3 can ignore the output of each infrared imaging sensor 42 when a wing 25 passes through its field-of-view and/or can disable each infrared imaging sensor 42 or its output as each wing 25 passes through its field-of-view thereby avoiding control system 3 from construing each wing 25 as an object in a chamber 33. Desirably, control system 3 ignores the output of each infrared imaging sensor 42 and/or disables each infrared imaging sensor 42 or its output a few degrees of rotation of revolver 21 before and after each wing 25 passes through its field-of-view in order to avoid false detection of a wing 25 as an unauthorized object, as might occur due to a change in the mechanical tolerances of revolver 21 over time or when an authorized person is pressing against a wing 25 when one or more infrared imaging sensors 42 differ from the reaction(s) exhibited during the learn cycle. After the learn cycle is complete, revolver 21 desirably returns to its start position.

Figure 5:
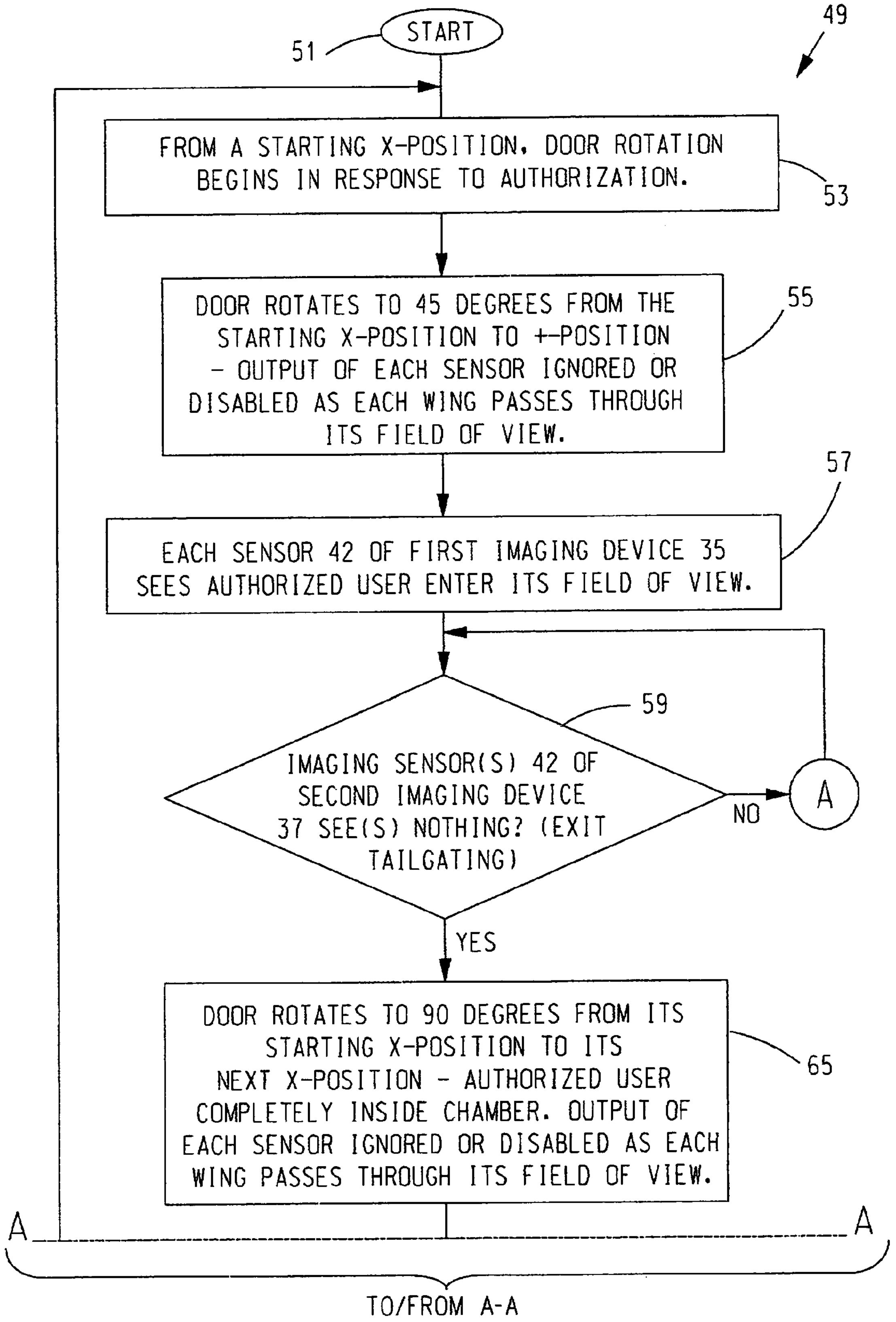
FIG. 5 is a flow diagram of a main control routine of the revolving door control system of the present invention for controlling the operation of the revolving door of FIG. 1.
Figure 5:
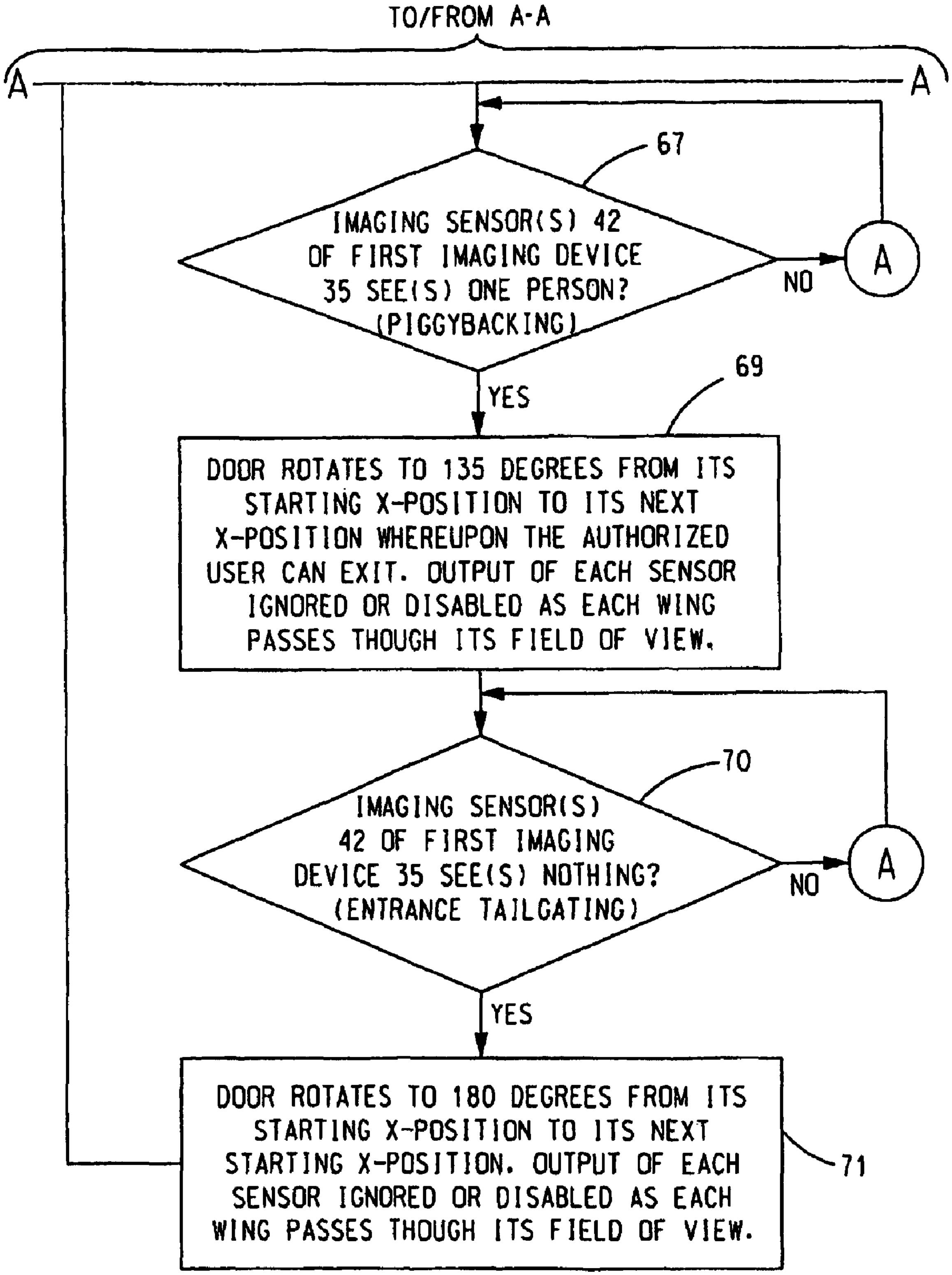
Figure 6:
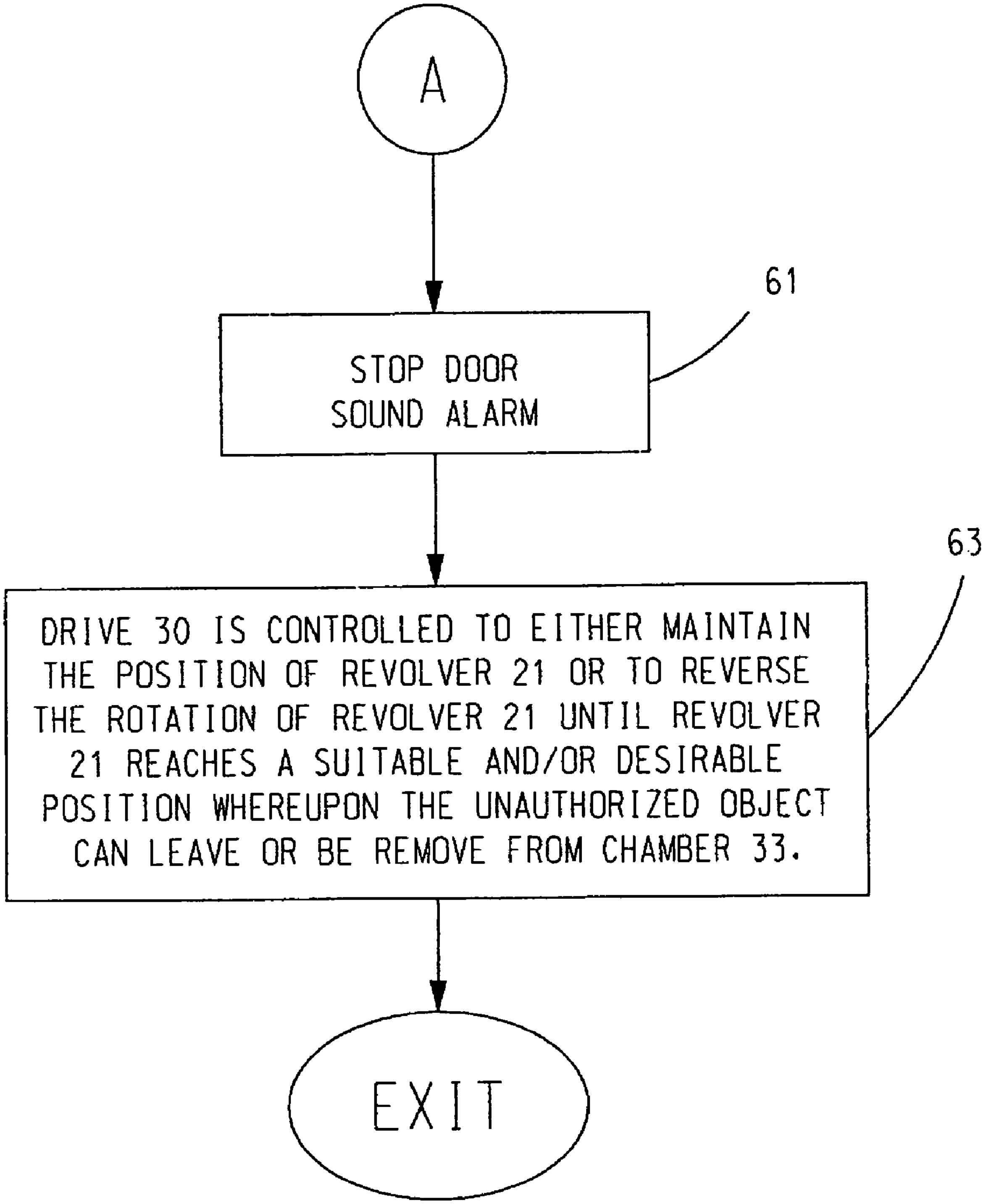
FIG. 6 is a flow diagram of a subroutine called by the main control routine of FIG. 5.

With reference to FIGS. 5 and 6, and with continuing reference to FIGS. 1-4, a method of operation of revolving door 1 will now be described with reference to main control routine 49. The method commences by advancing from a start step 51 to a step 53 wherein an authorized person approaches revolving door 1, which, for the purpose of describing the method will be assumed to be initially in the X-position shown in FIG. 2, from area 7 and identifies himself/herself via authorization device 28. In response to positive identification of the authorized person by authorization device 28, control system 3 causes drive 30 to commence rotating revolver 21 in the direction shown by arrow 32.

In step 55, revolver 21 is rotated 45 degrees from its starting X-position toward a first +-position of door 1. During this rotation, wing 25*a* of door 1 passes beneath each infrared imaging sensor 42 of first imaging device 35 and wing 25*c* passes beneath each infrared imaging sensor 42 of second imaging device 37. The output of each infrared imaging sensor 42 of imaging devices 35 and 37 is ignored or each infrared imaging sensor 42 of imaging devices 35 and 37 or its output is disabled as each wing 25*a* or wing 25*c* passes through its field-of-view. More specifically, by way of detecting the angular position of revolver 21 via the output of position sensor 31, control system 3, based on the information learned in the learn cycle, ignores the output of each infrared imaging sensor 42 or disables each sensor 42 or its output at a suitable time when a wing 25 passes in the field-of-view thereof in order to avoid the wing 25 passing in the field-of-view from being construed as an object in a chamber 33. The process of ignoring the output of each infrared imaging sensor 42 or disabling each sensor 42 or its output for each wing 25 passing in the field-of-view thereof is repeated for each sensor 42—wing 25 pair. Accordingly, the process of ignoring the output of each infrared imaging sensor 42 or disabling each sensor 42 or its output will not be described hereinafter for purpose of simplicity.

The method then advances to step 57 wherein, at a suitable time after an authorized person enters the chamber 33 between wings 25*a* and 25*b*, images are acquired of the authorized person in or moving through first area 39 via one or more infrared imaging sensors 42 of first imaging device 35. At the same time, infrared images of second area 41 are acquired by one or more infrared imaging sensors 42 of second imaging device 37. The method then advances to step 59, wherein if any one of infrared imaging sensors 42 of second imaging device 37 detects an object (e.g., an unauthorized person) in its field-of-view, control system 3 executes subroutine A shown in FIG. 6.

Upon entering subroutine A, step 61 is executed. In step 61, control system 3 deactivates drive 30 thereby stopping door 1. An alarm (not shown) may also be activated. Thereafter, step 63 is executed whereupon, under the control of control system 3, drive 30 either maintains the position of revolver 21, if said position provides sufficient room for the unauthorized object to leave or be removed from chamber 33 by second area 9, or reverses the rotation of revolver 21 until revolver 21 reaches a suitable and/or desirable position where the unauthorized object can leave or be removed from chamber 33 by second area 9. The method then exits subroutine A and returns to step 59 of main control routine 49.

If, in step 59, each infrared imaging sensor 42 of second imaging device 37 does not detect an unauthorized person, the method advances to step 65 wherein revolver 21 is rotated to its next X-position, i.e., revolver 21 is rotated 90 degrees from its starting X-position, at which point the authorized person is completely inside chamber 33 and each infrared imaging sensor 42 of first imaging device 35 either is detecting or has detected the authorized person in its field-of-view.

The method then advances to step 67 wherein control system 3 determines whether any infrared imaging sensor 42 of first imaging device 35 is detecting the presence of only the authorized person or the authorized person and at least one additional, unauthorized person in the chamber 33 between wings 25*a* and 25*b*.

Control system 3 can employ any suitable and/or desirable image processing technique to determine whether one or more infrared imaging sensors 42 of first imaging device 35 is/are detecting one person in its/their field(s)-of-view or if more than one person is being detected. For example, without limitation, control system 3 can employ an algorithm that determines whether a gap exists between two or more objects or persons detected in chamber 33 residing in or passing by or through first area 39 by one or more infrared imaging sensors 42 of first imaging device 35. The existence of such a gap can be interpreted by control system 3 as the presence of two or more objects or persons in chamber 33. In contrast, the absence of such a gap is interpreted by control system 3 as meaning that only one object or person is present in chamber 33. Similar comments apply in respect of detecting for the presence or absence of one or more objects or persons residing in or passing by or through second area 45 by one or more infrared imaging sensors 42 of second imaging device 37.

If in step 67 it is determined that more than one person is present in chamber 33 the method advances to subroutine A. Upon entering subroutine A, the method executes step 61 wherein control system 3 terminates the rotation of door 1 via drive 30 and outputs an optional alarm.

The method then advances to step 63 whereupon, under the control of control system 3, drive 30 reverses a rotation of revolver 21 until revolver 21 reaches a suitable and/or desirable position whereupon the unauthorized person can leave or be removed from chamber 33 by first area 7. The method then exits subroutine A and returns to step 67 of main control routine 49.

If in step 67 control system 3 determines that only the authorized person is present in chamber 33, the method advances to step 69 whereupon revolver 21 is rotated to its next +-position, i.e., revolver 21 rotates 135 degrees from its starting position.

The method then advances to step 70 wherein control system 3 determines whether any infrared imaging sensor 42 of first imaging device 35 is detecting the presence of an unauthorized person in the chamber 33 between wings 25*b* and 25*c* which is in or moving by or through first area 39 due to the rotation of door 1 135 degrees from its starting position. If in step 70 one or more infrared imaging sensors 42 of first imaging device 35 detects an unauthorized person in its field-of-view, control system 3 executes subroutine A.

Upon entering subroutine A, the method executes step 61 wherein control system 3 terminates the rotation of revolver 21 via drive 30. An optional alarm may also be provided. The method then advances to step 63 wherein drive 30 is controlled to maintain the position of revolver 21 or is controlled to reverse the rotation of revolver 21 until revolver 21 reaches a suitable and/or desirable position where the unauthorized person can leave or be removed from chamber 33 by first area 7. The method then exits subroutine A and returns to step 70 of main control routine 49.

If in step 70 each infrared imaging sensor 42 of first imaging device 35 sees nothing in the chamber 33 between wings 25*b* and 25*c*, the method advances to step 71 wherein revolver 21 is rotated to 180 degrees from its starting X-position to its next starting X-position. The method then returns to step 53.

The foregoing steps, 53-59, 65-71 and, as necessary, 61 and 63, are repeated by control system 3 to enable authorized persons to move from first area 7 to second area 9, or vice versa, while, at the same time, preventing unauthorized persons from moving from first area 7 to second area 9, or vice versa.

Another authorization device 28 may be included in second area 9 and interfaced with control system 3 which is operative in the manner described above to permit authorized persons to pass from second area 9 to first area 7 via revolver 21 in the manner described above for the passage of an authorized person from first area 7 to second area 9 while avoiding or preventing the passage of unauthorized persons from second area 9 to first area 7, or vice versa.

Other variations of revolving door 1 are also envisioned. For example, where security is not required for a person passing from second area 9 to first area 7, second imaging device 37 and the step(s) performed thereby may be omitted. In this case, a push-button or other such device interface with control system 3 may be provided adjacent opening 15 whereupon a user pressing the button initiates the rotation of revolver 21 whereupon the person can pass from second area 9 to first area 7.

Figure 7A:
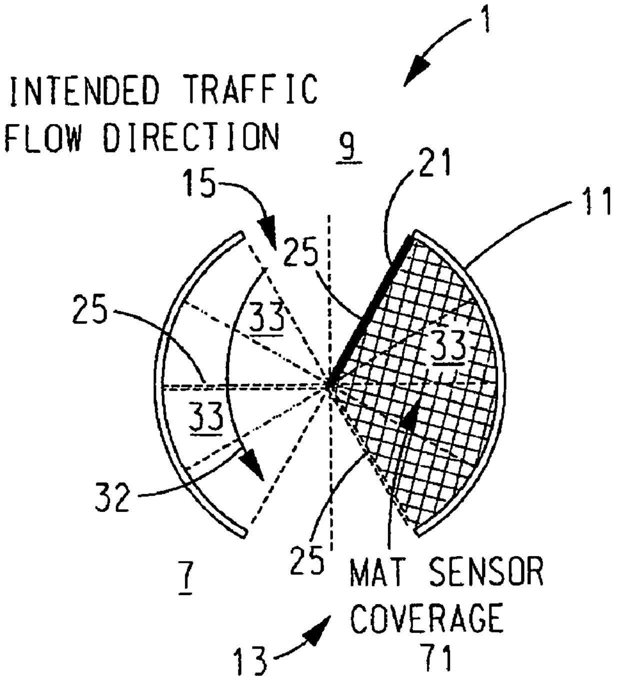
FIGS. 7A-7E are cross-sectional top-views of a revolving door that has a revolver with three wings.
Figure 7B:
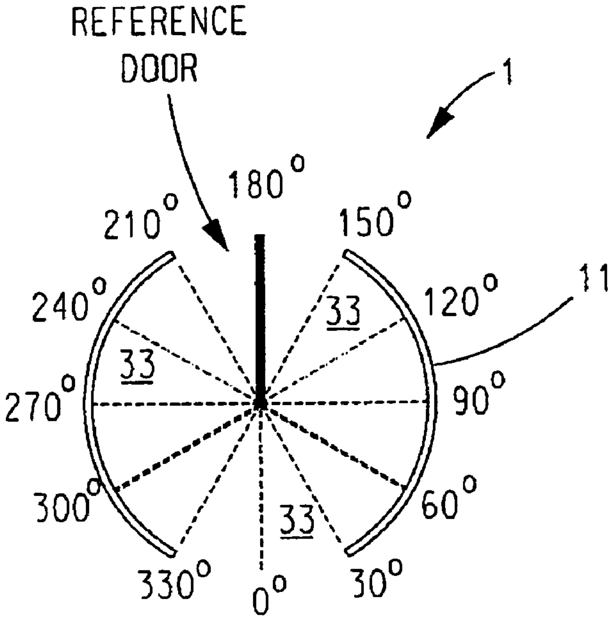
Figure 7C:
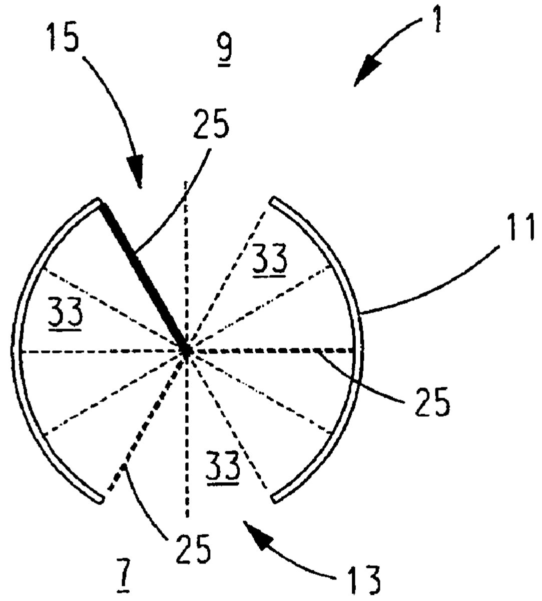
Figure 7D:
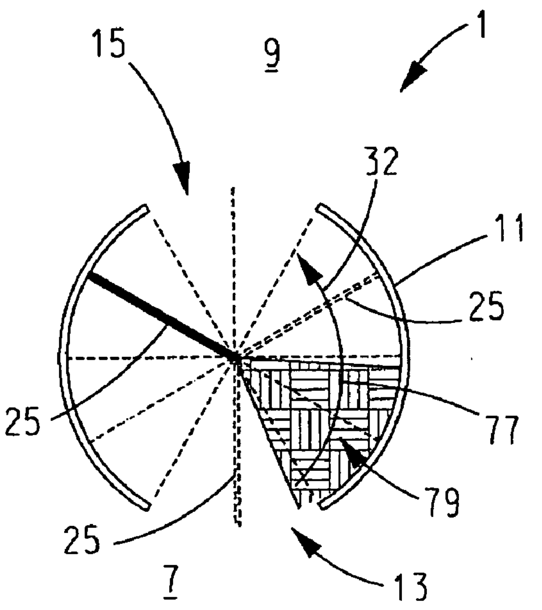
Figure 7E:
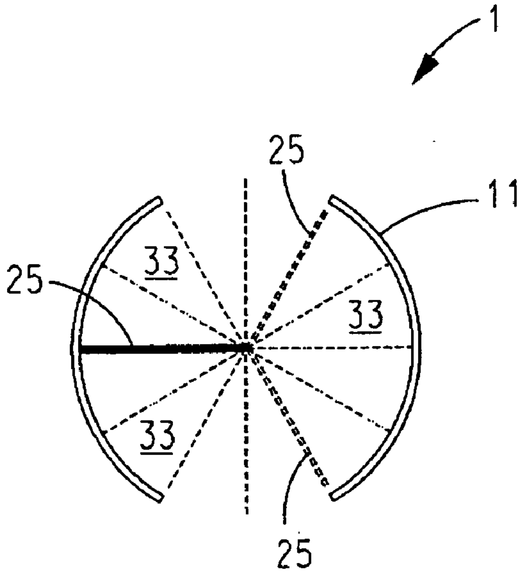

With reference to FIGS. 7A-7E, revolving door 1 may also be embodied to include a revolver 21 with three wings 25 spaced approximately 120° from each other. As shown in FIG. 7A, control system 3 may optionally include a mat sensor 71 provided in one of chambers 33 to provide additional information regarding the number of persons entering a given chamber 33. Furthermore, as described above, the revolving door 1 shown in FIGS. 7A-7E may be configured to provide one-way or two-way security between first area 7 and second area 9, wherein for two-way security authorization is required for passage from first area 7 to second area 9 and vice versa. In contrast, for one-way security, for a person to pass from first area 7 to second area 9, he/she will need to be authorized to verify that he/she is allowed to have access to second area 9. However, to pass from second area 9 to first area 7, such authorization is not required. In this instance, a user will only need to push a button or activate some other type of device positioned adjacent opening 15 to initiate the rotation of revolver 21. For one-way security, only one imaging device is necessary since only the area representing the intended flow of traffic 77 from first area 7 to second area 9 needs to be monitored to prevent an unauthorized person from entering. Accordingly, only one imaging device is provided above this area having sensor coverage 79. Where two-way security is required, another imaging device can be provided in the path a user follows between second area 9 and first area 7 to monitor for the presence of an unauthorized person passing therebetween.

As can be seen, the present invention utilizes infrared imaging sensors 42 desirably positioned in or above ceiling 19 of a revolving door 1 for detecting the presence of authorized and/or unauthorized persons or objects passing between the openings of the revolving door in one or both directions. By disabling each infrared imaging sensor 42 or its output, or ignoring the output of each infrared imaging sensor 42 when a door wing 25 of revolving door 1 passes through the field-of-view of the sensor, control system 3 avoids interpreting a door wing 25 passing in the field-of-view of the infrared imaging sensor 42 from being construed as an authorized or unauthorized object.

The use of one or more infrared imaging sensors 42 avoids the problems associated with prior art imaging sensors. The ability to detect infrared light emanating from the field-of-view of each infrared imaging sensor can be accomplished by an infrared camera, an infrared charge coupled device, and/or any other suitable and/or desirable device.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for controlling a revolving door comprised of a housing having a first opening, a second opening and a revolver positioned within the housing, the revolver having a plurality of door wings positioned about a rotation axis and dividing the housing into a plurality of chambers, the revolver operative for rotatably moving each chamber between the first opening and the second opening and vice versa, the method comprising the steps of:

(a) providing at least one infrared imaging sensor, the one infrared imaging sensor operative for acquiring infrared images of a first area where the plurality of chambers rotatably pass by or through;

(b) providing a drive means that is operative for rotating the revolver about the rotation axis;

(c) providing a position sensor that is operative for outputting signals indicative of the angular position of the revolver;

(d) causing the drive means to rotate the revolver in a first direction from a first position where a user can enter a first chamber via the first opening;

(e) acquiring infrared images via the at least one infrared imaging sensor and acquiring signals from the position sensor; and (f) based on the signals acquired from the position sensor, disabling each infrared imaging sensor or its output and/or ignoring each infrared image acquired by each infrared imaging sensor when each door wing is in its field-of-view.

2. The method of claim 1, wherein:

step (d) is executed in response to authorization by an authorization means disposed adjacent the first opening, and step (d) includes rotating the revolver to a second position where the user can exit the first chamber via the second opening.

3. The method of claim 2, wherein the authorization means is a card reader, a barcode reader, a biometric sensor or any combination thereof.

4. The method of claim 1, wherein:

step (e) includes acquiring infrared images within at least one chamber when the one chamber is aligned with the first area; and the method further includes one of the following:

(1) rotating the revolver to a second position where the user can exit the first chamber via the second opening; or (2) causing the drive means to not rotate the revolver and/or to rotate the revolver in a second, opposite direction when:

(i) more than one user is detected in the one chamber via the infrared images acquired by the at least one infrared imaging sensor;

(ii) an unauthorized user is detected in a second chamber that is aligned with the first area immediately following the passage of the one chamber by or through the first area via infrared images acquired within the second chamber by the at least one infrared imaging sensor; and/or (iii) an unauthorized user is detected in a third chamber in alignment with a second area via infrared images acquired within the third chamber by another infrared imaging sensor.

5. The method of claim 4, wherein step (2) includes rotating the revolver back to the first position.

6. The method of claim 4, wherein, in step (2)(iii), the other imaging sensor is operative for acquiring images within the third chamber on or about the time the one imaging sensor acquires images in the first or second chamber.

7. The method of claim 4, wherein step (2) further includes providing an alarm.

8. The method of claim 1, wherein the revolver has two, three or four wings dividing the housing into two, three or four chambers, respectively.

9. The method of claim 1, wherein the first position is either an X-position or a +-position of the wings with respect to the openings.

10. The method of claim 1, wherein the one infrared imaging sensor is either an active sensor operative for receiving and processing reflected infrared light that is initially output thereby, a passive infrared imaging sensor that is operative for receiving and processing infrared light that is output by at least one object in its field-of-view, or at least one camera for receiving and processing light in the visual spectrum.

11. A control system for use with a revolving door comprising a housing having a first opening, a second opening, a floor and a ceiling, and a revolver having a plurality of wings positioned about a rotation axis and dividing the housing into a plurality of chambers, the revolver positioned within the housing between the first and second openings, the revolver operative for rotatably moving each chamber within the housing, the control system comprising:

a first infrared imaging sensor for acquiring infrared images of a first area of the housing by or through which a first chamber passes;

a drive for rotating the revolver about the rotation axis;

a position sensor operative for outputting signals related to the angular position of the revolver; and a controller operative for processing the infrared images acquired by the first infrared imaging sensor and for determining therefrom a presence or absence of an object in the first chamber, for causing the drive means to rotate the revolver in response to a user's initiation, for detecting the angular position of the revolver via the position sensor, and for determining as a function of the signals output by the position sensor related to the angular position of the revolver when to (i) ignore infrared images acquired by the first infrared imaging sensor when each door wing is in a field-of-view thereof and/or (ii) disable the first infrared imaging sensor or its output when each door wing is in the field-of-view thereof.

12. The control system of claim 11, further comprising an authorization means disposed on the first opening side of the chamber and operative for identifying an authorized user.

13. The control system of claim 12, wherein the authorization means is a card reader, a barcode reader, a fingerprint or thumbprint scanner, a retinal scanner or any combination thereof.

14. The control system of claim 11, further including a second infrared imaging sensor for acquiring infrared images of a second area of the housing by or through which a second chamber passes on or about a time the first chamber passes through the first area, wherein:

the controller is operative for processing the infrared images acquired by the second infrared imaging sensor, for determining therefrom a presence or absence of an object in the second chamber, and for determining as a function of the signals output by the position sensor related to the angular position of the revolver when to (i) ignore infrared images acquired by the second infrared imaging sensor when each door wing is in a field-of-view thereof and/or (ii) disable the second infrared imaging sensor or its output when each door wing is in the field-of-view thereof.

15. The control system of claim 14, wherein:

in response to authorization by an authorization means disposed adjacent the first opening, the controller causes the drive to rotate the revolver in a first direction; and in response to detecting via any of the acquired infrared images the presence of an unauthorized object in at least one chamber, the controller causes the drive to stop rotation of the revolver and/or causes the drive to rotate the revolver in a second, opposite direction.

16. The control system of claim 15, wherein the unauthorized object is at least one of the following:

one of a pair of objects in the first chamber as it passes through the first area;

an object in the second chamber as it passes by or through the second area on or about the time the first chamber passes by or through the first area; and an object in a third chamber that begins passing by or through the first area immediately following passage of the first chamber by or through the first area.

17. The control system of claim 15, further comprising an alarm for providing a signal in response to detecting the unauthorized object.

18. The control system of claim 11, wherein the revolver has one of the following:

two wings dividing the housing into two chambers;

three wings dividing the housing into three chambers; or four wings dividing the housing into four chambers.

19. The control system of claim 18, wherein:

when four wings divide the housing into four chambers, the controller causes the revolver to rotate about 180 degrees each time the authorization means identifies an authorized user; and when three wings divide the housing into three chambers, the controller causes the revolver to rotate about 120 degrees each time the authorization means identifies an authorized user.

20. The control system of claim 11, wherein the first imaging sensor is either an active sensor operative for receiving and processing reflected infrared light that is initially output thereby, a passive infrared imaging sensor that is operative for receiving and processing infrared light that is output by at least one object in its field-of-view, or at least one camera for receiving and processing light in the visual spectrum.

* * * * *